Patented July 5, 1932

1,865,732

UNITED STATES PATENT OFFICE

GLENN H. WAGNER, OF BELLEVILLE, ILLINOIS, ASSIGNOR TO ALUMINUM COMPANY OF AMERICA, OF PITTSBURGH, PENNSYLVANIA, A CORPORATION OF PENNSYLVANIA

MAKING CONCRETE ARTICLES AND THE LIKE

No Drawing.    Application filed December 23, 1930. Serial No. 504,272.

This invention relates to the treatment of hydraulic cement-aggregate mixtures with bauxite residue for the purpose of developing in such mixtures uniformity of physical composition and strength. A further object of the invention is the provision of a hydraulic cement-aggregate mixture of high strength.

Bauxite residue, sometimes known as "red mud", is the insoluble residue remaining from the treatment of aluminous ore, such as bauxite, with alkali-dissolving agents which remove from the ore a major portion of its alumina content. The bauxite residue is composed chiefly of the oxides of aluminum, iron, silicon, titanium, calcium, and sodium. As it results from the alumina process it is in the form of a powder of minute particle size. The particles thereof are porous and capable of adsorbing water.

I have discovered that the addition of an amount of bauxite residue to hydraulic cement-aggregate mixtures increases the physical uniformity of such mixtures and produces a product of uniform strength. I have also discovered that hydraulic cement-aggregate mixtures to which bauxite residues have been added in accordance with my invention have, after setting, higher strengths than are usually developed in such mixtures under similar conditions.

The amount of residue which should be added in order to achieve the results of my invention will vary somewhat with the particular type of cement and aggregate used, as well as with the particular proportions in which the cement and aggregate are mixed. In usual cases, I have found that an amount of bauxite residue corresponding from about 5 to 20 per cent by weight of the amount of cement used in the mixture will produce satisfactory results, and in the case of Portland cement and sand mixtures, I prefer to use an amount of residue corresponding to about 10 per cent by weight of the amount of Portland cement in the mixture.

In practicing my invention in connection with a cement-aggregate mixture composed of 20 per cent of Portland cement, 70 per cent of sand, and 10 per cent of water, I have discovered that the addition of bauxite residue to this mixture in an amount corresponding to about 11 per cent by weight of the amount of Portland cement added, will produce a final concrete product which, after setting for three days, will have a tensile strength of 300 pounds per square inch, whereas the same Portland cement-sand mixture without the addition of the bauxite residue will have a tensile strength after three days of only 195 pounds per square inch. If to this same mixture is added bauxite residue in an amount corresponding to about 20 per cent of the weight of the Portland cement used therein, the concrete after three days will have a tensile strength of approximately 382 pounds per square inch. Moreover, the concrete mixtures to which bauxite residue was added in the amounts above named have a more uniform distribution of the aggregate within the mixture than did the concrete sample to which no bauxite residue was added. While increased strength is an important factor, a uniformity of the aggregate throughout the mass of the hydraulic cement-aggregate mixture is of considerably greater importance since the segregation of aggregate in the cement-aggregate mixture will and does result in planes of weakness in the concrete structure.

The addition of bauxite residue to the cement-aggregate mixtures may be accomplished in any convenient way. For instance, the bauxite residue may be mixed with the cement at the time it is packed in containers for shipment. Likewise, the proper quantity of bauxite residue may be introduced into the mixing machine during the well known mixing processes by which the cement and the aggregate are mixed with water to form the usual concrete slurry which is then cast to form the desired article.

The novel effects produced in the practice of my invention by the addition of small amounts of bauxite residue to hydraulic cement-aggregate mixtures are probably explained in part on the theory that the finely divided residue disseminates uniformly throughout the mixture and, by virtue of its physical and chemical reaction with the water, forms a gel-like substance which, acting as a matrix throughout the mixture of the hydraulic cement and aggregate particles, tends to promote a smooth and uniform movement therebetween, thus creating the highly desired uniform mixing of the materials. It is my theory also that the particles of the bauxite residue, by virtue of their propensity to adsorb water, act as carriers for a part of the water of the mixture and tend to distribute it uniformly throughout the mixture and in contact with the hydraulic cement particles, thus insuring uniform hydration or setting. The practice of my invention is, however, readily accomplished without reference to the above explanation and I do not desire to be limited to any theory herein set forth as to the methods in which the novel effects of my invention are produced.

Having thus described my invention, I claim:

1. The method of developing uniformity in hydraulic cement-aggregate mixtures comprising adding to the mixture, bauxite residue from the treatment of bauxite with an alkaline solvent.

2. The method of developing uniformity in hydraulic cement-aggregate mixtures comprising adding to the mixture bauxite residue from the treatment of bauxite with an alkaline solvent, and mixing it thoroughly therewith.

3. The method of developing uniformity in hydraulic cement-aggregate mixtures comprising mixing therewith a bauxite residue from the treatment of bauxite with an alkaline solvent, characterized by fine particle size and adsorbent qualities.

4. A composition of matter comprising cement capable of setting by hydration, and bauxite residue from the treatment of bauxite with an alkaline solvent.

5. A composition of matter comprising cement capable of setting by hydration and bauxite residue from the treatment of bauxite with an alkaline solvent, in intimate admixture.

6. An article of hydrated cement and an aggregate, having disseminated therethrough, bauxite residue from the treatment of bauxite with an alkaline solvent.

7. A cast article of hydrated cement and an aggregate, having bauxite residue from the treatment of bauxite with an alkaline solvent, in the form of minute particles distributed through the article with substantial uniformity.

In testimony whereof I hereto affix my signature.

GLENN H. WAGNER.